United States Patent Office 2,837,433
Patented June 3, 1958

2,837,433

MILDEW RESISTANT PAINT COMPOSITION

Robert F. Heran, Sr., Cleveland, Ohio, assignor to The Pioneer Manufacturing Company, Cleveland, Ohio, a corporation of Ohio No Drawing. Application February 23, 1954
Serial No. 412,068

6 Claims. (Cl. 106—18)

The present invention relates generally to the paint compounding art and is more particularly concerned with a novel painting composition in which mildew resistance and desirable drying characteristics are uniquely combined.

Mildew resistance is a highly desirable property in a paint for many applications and it is well known in the art that copper naphthenate incorporated in paints and varnishes will make these compositions mildew resistant. Unfortunately, however, copper naphthenate is also known to inhibit the drying of paints and varnishes to the point where these compositions are practically non-drying and generally of little value when they contain sufficient copper naphthenate to be effectively mildew resistant.

It is a primary object of this invention to provide a paint composition which combines the mildew resistance of copper naphthenate paints and varnishes with the drying properties of other conventional paints.

It is a further object of this invention to provide a paint composition which is easy and economical to make and use and which has all the durability and covering power of the better conventional paints.

Other objects and advantages of the present invention will appear as the description of this invention proceeds.

In accordance with this invention, copper naphthenate and ferri-ferrocyanide or ferric-ferricyanide are incorporated in a paint composition with other substances essential to the painting results desired. This mixture is made as a result of my surprising discovery that when these two substances are used together in a paint composition, the drying inhibiting effect of the copper naphthenate is substantially completely offset or overcome by the cyanide derivative. These two materials are used in amounts within certain limits in accordance with the preferred practice of this invention to obtain the novel effects noted above and to obtain in addition the covering power and the economy and ease of manufacture and use characteristics of heretofore conventional paints. It is not necessary, however, in order to secure the important advantages of this invention that the said cyanide compound and the naphthenate be in any particular ratio or proportion to each other.

Preferably, copper naphthenate containing about 8% by volume of metallic copper in solution is employed in an amount between about 1% and about 3% by volume of the paint composition. While larger amounts of copper naphthenate might be used, I have found that consistently good drying results cannot be expected even where quantities of the iron-cyanide complex in the upper levels of the hereinafter specified range of this substance are employed. Furthermore, I have not observed that the mildew resistance of paints incorporating substantially larger quantities of copper naphthenate is sufficiently enhanced to justify the cost.

The iron-cyanide complex in accordance with this invention is used in an amount between about 0.36% and about 5.0% by volume of the paint composition. Ranges which are especially suitable are from about 0.36% to about 3.0% or from about 0.36% to about 3.62%. However, in accordance with my preference, this material is used in an amount approximating 1.5% by volume of the paint composition. The lower limit of this range is particularly critical inasmuch as I have found that where the amount of the aforesaid complex is materially less than 0.36% by volume of the paint composition, the drying results of this invention are not consistently obtained. Excessive amounts of the iron-cyanide compound are not only uneconomical in terms of drying effects obtained, but also do not afford proportionately increased coloring effects.

As I prefer to practice this invention, copper naphthenate containing about 8% of metallic copper in solution is mixed with chrome green and linseed oil, the copper naphthenate being used in an amount approximating 2.0% by volume of this mixture, while the chrome green accounts for about 1.5% of ferri-ferrocyanide by volume of the said mixture. Other materials conventional in paint mixtures are suitably incorporated in the amounts required for the results desired and the foregoing advantages and results of this invention are consistently obtained.

Those skilled in the art will gain a further understanding of this invention as it has actually been practiced successfully to provide the foregoing results and advantages.

*Example I*

A total of 31.5 gallons of raw linseed oil and 3.75 gallons of mineral spirits served as the vehicle for a paint mixture containing 100 lbs. of chrome green, 75 lbs. of zinc oxide, 25 lbs. of talc 151–A, 12 lbs. of 8% copper naphthenate, 2 lbs. of ground aluminum stearate and 0.25 gallon of 6% cobalt naphthenate.

To determine the mildew resistance of this composition which exhibited good drying characteristics, a paint sample was tested under standard test conditions in a mold chamber, six pieces of wood being provided with two coats of this paint and sprayed with a suspension of mixed spores of the following fungi:

*Aspergillus flavus*, AMC No. 26
*Aspergillus niger*, USDA Tc215–4247
*Penicillium luteum*, USDA 1336.1
*trichoderma sp.*, T–1

The temperature of the mold chamber was maintained at 30° C. (±2°) with a relative humidity of 95% (±5%). The test samples were retained in the mold chamber under these conditions for thirty days, whereupon they were removed from the chamber and carefully examined for fungus growth. No visible growth was observed on any of the painted surfaces, indicating a high degree of mildew resistance in the paint.

Where amounts, proportions or percentages are stated herein and in the appended claims, the volume basis is referred to unless otherwise expressly provided.

Having thus described the present invention so that those skilled in the art may be able to gain a better understanding and practice the same, I state that what I desire to secure by Letters Patent is defined in what is claimed.

What is claimed is:

1. A mildew resistant, drying oil base, paint composition consisting essentially of a pigment including ferri-ferrocyanide, copper naphthenate and a vehicle suitable for use with copper naphthenate, the ferri-ferrocyanide and the naphthenate being present in amounts between about 0.36% and about 3.62% by volume of the paint composition and between about 1.0% and about 3.0% by volume of the paint composition, respectively.

2. A mildew resistant, drying oil base, paint composition consisting essentially of a pigment including ferri-ferrocyanide, copper naphthenate and a vehicle suitable for use with copper naphthenate, the ferri-ferrocyanide and the naphthenate being present in amounts approximating 1.5% of the paint composition and approximating 2.0% by volume of the paint composition, respectively.

3. A mildew resistant, drying oil base, paint composition consisting essentially of chrome green in excess of about 0.36% by volume, linseed oil and copper naphthenate in an amount between about 1% and about 3% by volume of the paint composition, said copper naphthenate containing about 8% of metallic copper in solution.

4. A mildew resistant, drying oil base, paint composition consisting essentially of a pigment comprising a cyanide selected from the group consisting of ferro-ferricyanide and ferri-ferricyanide, linseed oil and copper naphthenate, the cyanide and the naphthenate being present in amounts between about 0.36% and about 3.0% by volume of the paint composition and between about 1.0% and about 3.0% by volume of the paint composition, respectivley.

5. A mildew resistant, drying oil base, paint composition and consisting essentially of a pigment including ferric-ferricyanide, linseed oil and copper naphthenate, the ferric-ferricyanide and the naphthenate being present in amounts between about 0.36% and about 5.0% and between about 1.0% and about 3.0% by volume of the paint composition, respectively.

6. A composition, for use in a drying oil base paint, consisting essentially of a pigment comprising a cyanide selected from the group consisting of ferro-ferricyanide and ferri-ferricyanide and copper naphthenate, the cyanide and the naphthenate being present in amounts between about 0.36 part and about 3 parts and between about 1 part and about 3 parts, respectively.

References Cited in the file of this patent

UNITED STATES PATENTS

| | | |
|---|---|---|
| 2,390,830 | Elliott | Dec. 11, 1945 |
| 2,489,228 | Rudd | Nov. 22, 1949 |
| 2,528,429 | Elliott | Oct. 31, 1950 |

OTHER REFERENCES

Von Fischer: "Paint and Varnish Technology," published by Reinhold (1948) (p. 275 relied upon).

"National Paint Dictionary" (Stewart), published by the Stewart Research Laboratory, Washington, D. C., 3rd edition, 1948.

"Uses and Applications of Chem. and Related Materials" (Gregory), published by Reinhold Publishing Corp., N. Y., vol. II, 1944.